Jan. 5, 1926. 1,568,090
L. SAIVES
ENDLESS TRACK VEHICLE
Filed April 1, 1924
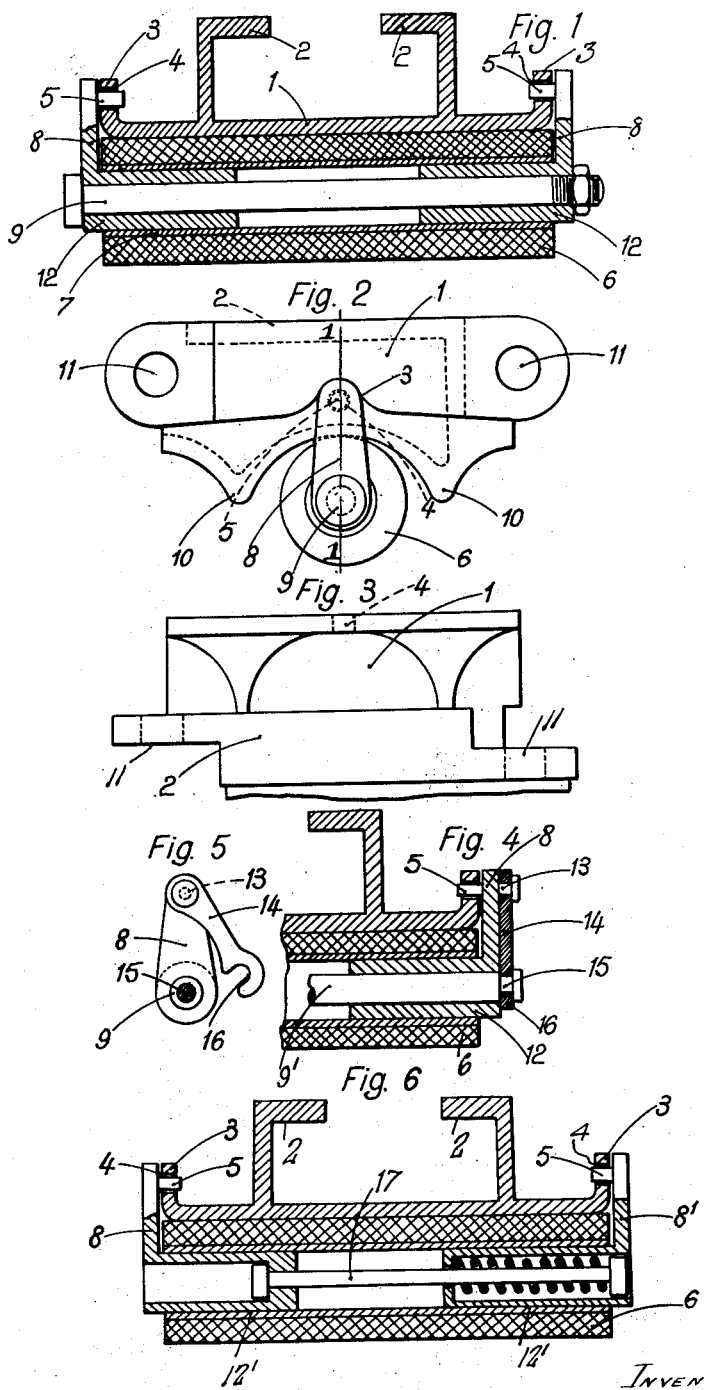

Patented Jan. 5, 1926.

1,568,090

UNITED STATES PATENT OFFICE.

LEON SAIVES, OF BILLANCOURT, FRANCE, ASSIGNOR TO LOUIS RENAULT, OF BILLANCOURT, FRANCE.

ENDLESS-TRACK VEHICLE.

Application filed April 1, 1924. Serial No. 703,389.

*To all whom it may concern:*

Be it known that I, LEON SAIVES, a citizen of the French Republic, residing at Billancourt, Department of the Seine, in France, and having P. O. address 15 Rue Gustave Sandoz, in said city, have invented certain new and useful Improvements in or Relating to Endless-Track Vehicles; and I do hereby declare the following to be a full, clear, and exact description of the invention, such as will enable others skilled in the art to which it appertains to make and use the same.

The invention relates to improvements in endless track vehicles and has for its object to provide the links or shoes of the endless chains with readily attachable and detachable resilient blocks, preferably in the form of rollers mounted below the tread surfaces, as illustrated in the accompanying drawings, in which:—

Fig. 1 is a transverse section of a link and attached resilient block, on line 1—1 of Fig. 2.

Fig. 2 is a side elevation of the link.

Fig. 3 is a half plan of the link.

Fig. 4 is a fragmentary section, similar to that in Fig. 1, showing a modified fastening means.

Fig. 5 is an end elevation of the fastening means shown in Fig. 4.

Fig. 6 is a view, similar to Fig. 1, illustrating a further modification of means for detachably connecting the block to the link.

Referring to Figs. 1, 2 and 3 of the drawings, 1 indicates the body of the link, the top surface of which is provided with overhanging guide flanges 2, 2 with which the rollers on the frame of the vehicle engage, to retain the endless track made up of the links in proper operative relation. The opposite ends of the link are provided with the usual spaced ears 11, 11 to permit the links to be connected together in continuous series by the customary pintles. Preferably the under side of the link is provided with spaced spurs or spuds 10, 10 to increase the tractive effect, when the vehicle is operating over rough ground.

Each side edge 1 is provided with upstanding lugs 3, 3 having perforations 4 therein, which lugs serve as the means for attaching the resilient block or roller 6 to the link in proper position to engage the under face of the link and constitute a cushioning support for the link, when the vehicle is operating over relatively smooth surfaces.

As indicated, the resilient block is preferably in the form of a hollow cylinder of rubber, or the like, which is mounted upon and reinforced by an internal metallic tube 7. Fitted loosely within the ends of the tube 7 are sleeves 12, 12 provided with arms 8, 8, respectively, each arm having a pin 5 near its upper end adapted to engage a corresponding opening in the lugs 3 on the link, thereby holding the cylindrical rubber block 6 in proper engagement with the link. A bolt 9, passing longitudinally through the roller 6 and engaging the bores of the sleeves 12, 12, serves to secure the sleeves within the roller and lock the latter to the link, the roller 6 being readily detachable from the link by unscrewing the nut on the end of the bolt 9 and moving the sleeves 12, 12 longitudinally of the bore of the roller 6 to disengage the pins 5 from the perforated lugs 3. As thus constructed, it will be apparent that the resilient block or roller 6 may be quickly attached to and detached from the link, as the condition of the surface upon which the vehicle is operating may require.

It will also be apparent that two or more of the rollers may be applied to each link, if it is found desirable, and also that the resilient blocks or rollers may be applied to links of various other forms.

In Fig. 4, there is illustrated a modified form of means for quickly attaching and detaching the resilient blocks or rollers. In this modification, the bolt 9 of Fig. 1 is replaced by a spindle 9' having one or both of its ends provided with a reduced neck 15, adapted to be engaged by the hook end 16 of a latch 14 pivoted on the stud 13 secured to the arm 8 of sleeve 12. In other respects, the construction is the same as that shown in Figs. 1, 2 and 3. If desired, both ends of the spindle 9' may be provided with a reduced neck 15 and a latch 14 secured to each arm 8, 8 of the sleeves 12, 12, but ordinarily one latch 14 will suffice to lock the sleeves 12, 12 within the roller 6 by means of the bolt or spindle 9'.

Fig. 6 shows a modification which differs from those hereinbefore described only in the means for detachably securing the roller to the link. In this instance, the sleeves 12', 12' are connected by a double headed spindle 17, which passes through openings in the inner ends of the sleeves and is provided with a helical spring 18, which normally tends to draw the sleeves together, when they are mounted within the bore of the roller 6. By moving either of the sleeves longitudinally of the bore of the roller 6, the pin 5 on the corresponding arm 8 of the sleeve may be disengaged from the perforated lug on the link, so that the roller and its supporting means may be quickly separated from the link. In order to apply the roller to the link, it is necessary only to separate the sleeves supported by the spindle 17 sufficiently to permit the pins 5 to snap into the perforated lugs on the link, when said pins are brought into registry with the perforations, as will be clearly understood from the illustration.

What I claim is:

1. A link for chains of endless track vehicles provided with lateral perforated lugs, a resilient tread block, and means for detachably connecting said block to the link, said means comprising sleeves inserted in the ends of the block, arms on the sleeves having pins engaging the perforated lugs, and a tie bolt passing through the sleeves.

2. A link for chains of endless track vehicles provided with lateral perforated lugs, a resilient hollow cylindrical tread block, sleeves inserted in the ends of said block, arms on the sleeves having pins engaging the perforated lugs, and a tie bolt passing through the sleeves.

In testimony whereof I affix my signature.

LEON SAIVES.